United States Patent [19]
Debeaud

[11] Patent Number: 4,707,310
[45] Date of Patent: Nov. 17, 1987

[54] METHOD FOR HEAT CONTROL OF HOT RUNNER MOLDS

[75] Inventor: Pierre Debeaud, La-Queue-en-Brie, France

[73] Assignee: Albert Denis S.A., Aulnay-sous-Bois, France

[21] Appl. No.: 732,741

[22] Filed: May 10, 1985

[30] Foreign Application Priority Data

May 16, 1984 [FR] France ............................ 8407602

[51] Int. Cl.⁴ ...................... B29C 45/27; B29C 45/78
[52] U.S. Cl. .................... 264/40.6; 264/328.9; 264/328.14; 425/144; 425/548
[58] Field of Search ............... 264/40.6, 328.9, 328.14; 425/143, 144, 547, 548, DIG. 229

[56] References Cited

U.S. PATENT DOCUMENTS

| 3,520,026 | 7/1970 | Stidham et al. ............... 425/547 |
| 3,822,867 | 7/1974 | Evans .......................... 264/329 |
| 3,911,251 | 10/1975 | Day ............................ 425/144 |

FOREIGN PATENT DOCUMENTS

| 2427532 | 12/1975 | Fed. Rep. of Germany . |
| 1500876 | 11/1967 | France . |
| 2503891 | 10/1982 | France . |
| 0191032 | 11/1982 | Japan ........................... 425/547 |
| 0051126 | 3/1983 | Japan .......................... 264/40.6 |
| 1467180 | 3/1977 | United Kingdom . |

*Primary Examiner*—Jan H. Silbaugh
*Assistant Examiner*—James Bartholomew

[57] ABSTRACT

A method of controlling the heating of hot runner molds for injection molding of thermoplastic objects is disclosed, whereby the mold cavities (11, 12) receive the material to be molded via channels or runners divided into five heating zones (I through V), the temperature of each zone being controlled by means of an electric heating element (EC) associated with a thermocouple. In the event of failure of one zone's thermocouple, heat control is continued in said zone according to the power applied to the heating element of an adjacent zone.

5 Claims, 5 Drawing Figures

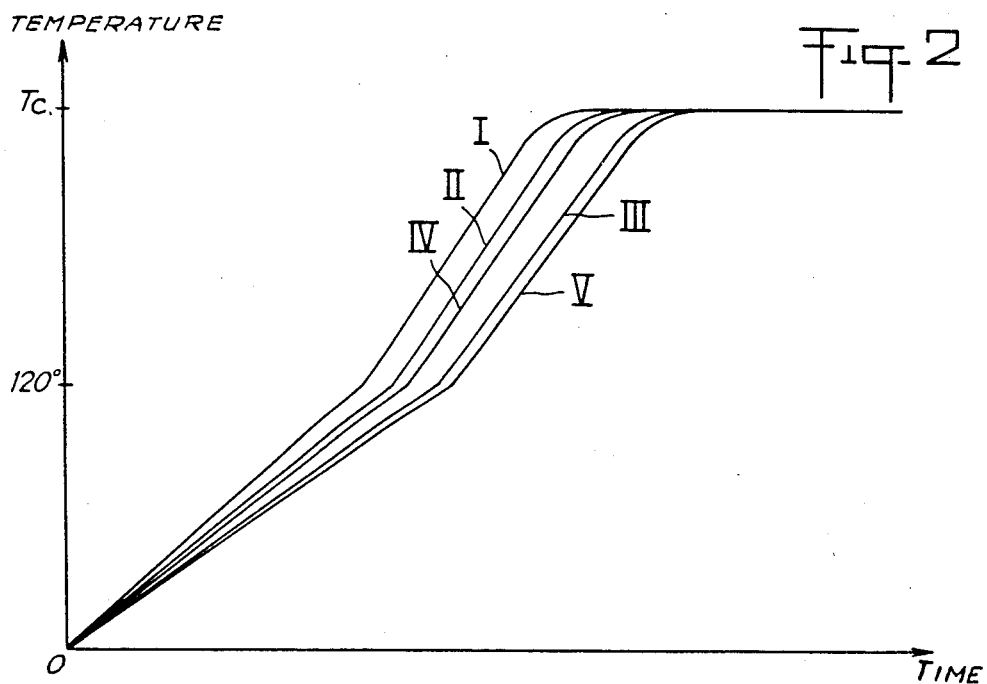
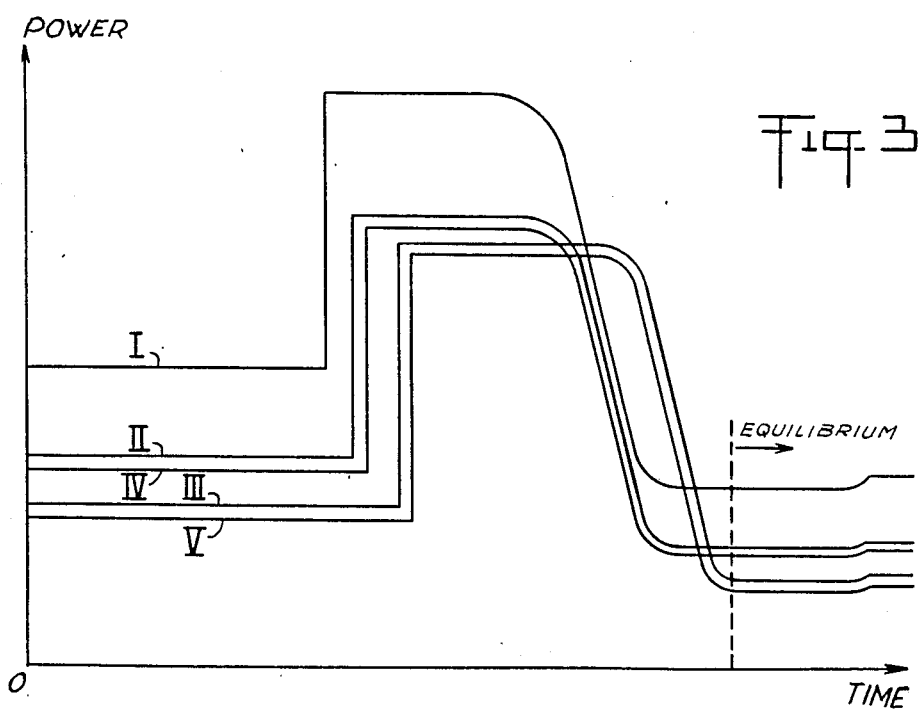

METHOD FOR HEAT CONTROL OF HOT RUNNER MOLDS

This invention primarily concerns a method of controlling the heating of hot runner molds, according to which, for each of the heating zones provided for in the supply runners of the material to be molded, use is made of a temperature control circuit controlling the electric power applied to a heater element placed in the said zone as a function of the value of the temperature measured by a thermometric probe, such as a thermocouple, which is placed in such zone, whilst the correct operation of the said probe is constantly monitored and, in the event of the latter failing, the control circuit is switched to a different mode of operation which mades it possible to continue the electricity supply to the corresponding heater element.

It is known that injected thermoplastic parts can be obtained by molding in cavities, which are filled by the liquid plastic material, after it has been conveyed within feed runners.

If these runners are not heated, the plastic material solidifies in them, after molding, into a sprue, which must be ejected at the same time as the molded part, before a new part can be molded. This technique, known as the "cold runner" technique, thus gives rise to a loss of material.

For a long time, when the number of parts to be molded is high or when the weight of the sprue is great as compared with the part, it has been known that the runners may be heated, either from the outside or from the inside, in order to maintain the plastic in a liquid state until the point of injection. Thus the loss of material due to the sprue is eliminated; moreover, the mold can be automated more easily, and the molding rate can be increased.

The use of this technique, known as the "hot runner" technique, led to the development of different methods of heating, and therefore of heat control. It is necessary to ensure a constant temperature throughout the passage followed by the liquid material, the length of which varies according to the number of cavities in the mold, the size of the parts, etc.

The margin of error acceptable for the temperature along the path followed by the liquid material depends on the nature of such liquid material. Every thermoplastic material is characterized by its melt temperature and its degradation threshold temperature (temperature beyond which the plastic material loses its physical or chemical properties). The molding temperature must therefore necessarily be comprised within the range hereinbefore defined, the scope whereof varies according to the materials, from approximately 100° C. to 15° C. for the most delicate materials.

In order to ensure the best regularity of temperature in hot runners, such hot runners are subdivided into several zones, which zones have respective heater elements, which are supplied separately with electric current by means of individual control circuits, on the basis of zone temperature information provided by thermometric probes associated respectively with the heater elements.

If one of the probes fails, there is no longer any heat control in the corresponding zone, and the temperature of the plastic in such zone exceeds the limits of the authorized range. There is therefore a risk of solidification in this zone, hence the necessity to dismantle the mold, which is a long, sometimes delicate, and always expensive operation.

In order to counter this problem, a well-known solution is to place the control circuit corresponding to the defective probe in the manual operation mode, whereby an operator regulates such circuit to control the application of a defined power to the heater element. But this power is set (at best, it may be adjusted manually), and there is no longer any heat control in the zone in question.

It is an object of the present invention to permit the continuation of the heating with heat control in a zone, the probe of which has failed.

This method consists essentially of automatically switching the control circuit of the zone with a defective probe to an operating mode wherein heat control in heating power will be continued by applying to the heater element of the said zone an electric power, the value of which represents a constant percentage deviation from a reference value composed of the value of the power applied to the heater element of another defined zone, such deviation being maintained equal to that which exists between the values of the powers applied to the heater elements of the two zones in question in a situation of equilibrium, when everything is operating normally.

Thus, according to the method hereinbefore defined, the zone in question continues to be thermally regulated automatically, in spite of the failure of its thermometric probe, this being achieved by control of power, instead of control of temperature.

In order to obtain, in such second set of operating conditions, a temperature of a value close to that which would have been obtained in the initial temperature control conditions, it shall be necessary to choose, for the said other zone providing a power reference, an adjacent or corresponding (i.e. homologous) zone (for example, with a symmetrical configuration) to the zone where the probe has failed.

The percentage deviation between the two power values may be maintained equal to that which existed when the said probe first failed. But, preferably, it shall be maintained equal to the deviation which has previously been noted and recorded in equilibrium conditions, when everything is functioning normally. This latter provision has the advantage of making it possible not only to control, but also to bring all of the runners to the required temperature, from the ambient temperature, in spite of the failure of one of their probes.

Since it is possible that a plurality of probes could fail, it shall be convenient to provide for the possibility of automatically switching each zone to a plurality of other zones following a predetermined order to control it in terms of heating power. Thus the mold may continue to be controlled after several probe failures. In extreme cases, the mold could function with one single probe controlling all of the heating zones.

It is another object of the invention to provide a heat control device making it possible to use the hereinbefore defined method. This device comprises, for each zone of the runners to be heated, a control circuit connected on the one hand to a thermometric probe, such as a thermocouple, placed in the zone, and, on the other hand, to a power source supplying electric current to a heater element which is also placed in such zone in order to control the temperature of the latter, provision having been made for a device to monitor the correct operation of the probe. Furthermore, the invention comprises a switching device which, in the event of a failure of the probe recorded by the monitoring device, connects the inlet of the control circuit to the outlet of the power source of another defined zone, and places the control circuit relating to the zone, the probe of which has failed, in an operating mode such that it applies to the heater element which it supplies a power which has a percentage deviation from the power received by the heater element of the said other zone which has a value which is maintained constant and equal to that of the deviation which exists between the powers applied respectively to the two heater elements in question when the control device is operating normally and is in a situation of equilibrium.

In order to further increase operating safety, the switching device relating to each control circuit must be able to connect the inlet of the latter to the power source of any one of a plurality of other zones. Thus, if necessary, each zone can receive a power reference from one of these other zones. To this end, the device shall preferably comprise a memory containing, for each zone, the indication of the other zone or zones with which the said zone may be connected according to a predetermined order, in the event of a failure of its probe. It may also include a memory containing, for each zone, the correction coefficient to be applied respectively to the reference power which may be supplied to it by every other zone in order to obtain the value of the power to be applied to the heater element.

According to a preferred embodiment of the invention, the device shall be fitted with a microprocessor which shall be responsible, in particular, for all of the zones, for the probe monitoring, storage in memory of the power correction coefficients, and the switching of the control circuits in relation to the operating modes of such circuits and the inter-zone connections.

Other features and advantages of the invention will become more readily apparent in reading the following description of a non-limiting example, with reference to the appended drawings, in which:

FIGS. 2 and 3 show the curves reflecting the respective variations, as a function of time, of the temperature and the heating power relating to the different zones of the runners of the mold when such zones are being brought to the required temperature, then in a controlled state of thermal equilibrium.

Figure 4:
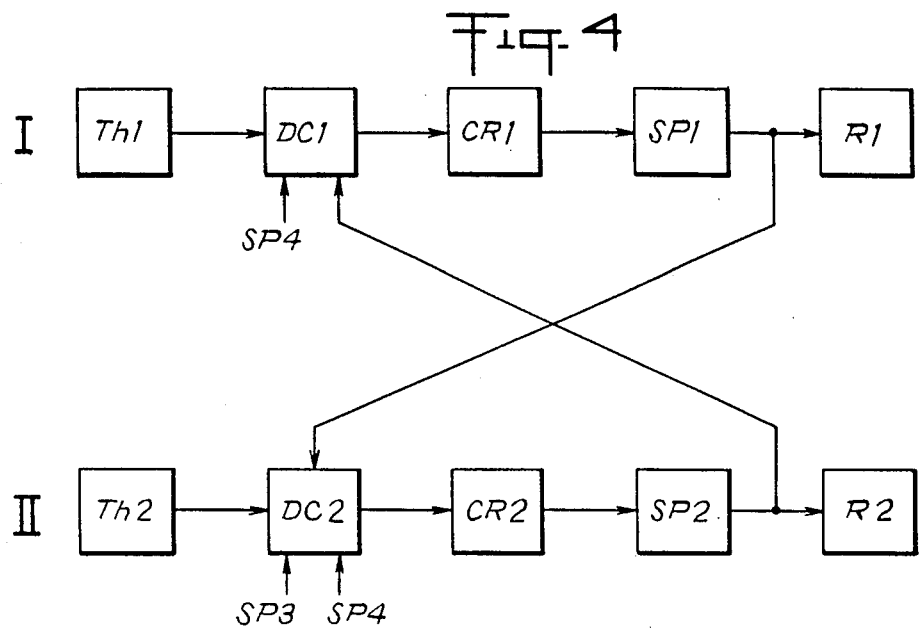
Figure 5:
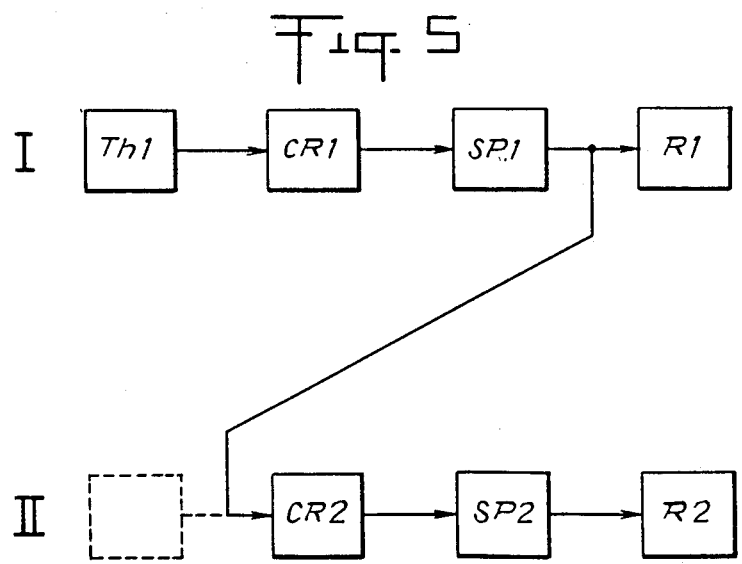

FIG. 4 gives a schematic representation of the portion of the control device corresponding to two zones;

FIG. 5 shows the functional diagram of the elements of FIG. 4 after the failure of the thermometric probe of one of the zones.

Figure 1:
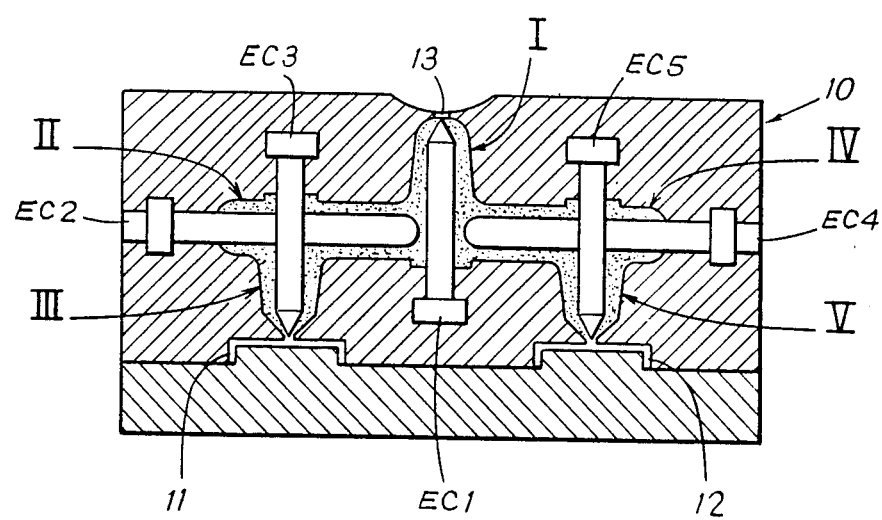
FIG. 1 shows a simplified cross-section of a hot runner mold.

FIG. 1 shows a mold 10 with two cavities 11, 12, supplied by molding thermoplastic feed runners from an inlet aperture 13, which is connected to an injection press. In order to avoid the formation of sprues of solidified material in the said runners, such runners are heated by means of electric heater elements. To this end, the feed runners are divided into five zones, I to V, each of which has its own heater element, EC 1 to EC 5. Each heater element, which contains, in a protection tube, an electric resistor R 1 to R 5, and a thermocouple Th 1 to Th 5, is connected (FIG. 4) to a control circuit CR 1 to CR 5, which controls, in accordance with the temperature information received from the corresponding thermocouple, a power source SP 1 to SP 5 which applies an electric current to the corresponding heater element of a value such that the temperature of the zone is regulated and maintained at a predetermined set level.

Each source SP 1 to SP 5 supplies alternating electric current, the rms value of which is modulated by being divided up into wave trains, by the division of the alternations, or by the elimination of negative and, if necessary, positive half cycles.

In an initial warm-up phase (FIGS. 2 and 3), the five resistors R 1 to R 5 are supplied at half-power approximately, until the temperature of the five zones reaches a predetermined value which, in the present example, is equal to 120° C. Then the resistors receive a current corresponding to their respective rated power. This second phase comes to an end on reaching an equilibrium where the temperatures of the different zones I to V have reached their set value Tc. Henceforth, the heat control is effected in each zone on the basis of the temperature measurements supplied by the respective thermocouples.

In the control phase, the power levels applied to the different heater elements may vary essentially to offset any possible changes in the conditions outside of the mold: ambient temperature, temperature of the plastic when it enters the mold, molding rate, etc. This results in the heating power variation curves being homothetic in this phase. Thus it may be observed that, if the heating power of zone V increases by 10% - going, for example, from 100 to 110 W - the heating power of zone III, symmetrical to zone V, will also increase by 10% -going, for example, from 120 to 132 W. In other words, in a situation of equilibrium, the power levels applied to the various heater elements may vary, whilst maintaining constant proportions to each other, for example, a ratio of 2 / 1.5 between zones I and II, 1.2 / 1 between zones III and V, etc. This is true with a very low error margin, because the mold in equilibrium forms a whole, and only external influences change this equilibrium and, consequently, the power levels necessary to maintain an identical temperature in all of the zones, as every variation in a given external parameter entails a modification of the heating powers in the same proportions.

A switching device DC is placed (FIG. 4) between the control circuit CR relating to each zone and the corresponding thermocouple Th. In the event of a failure of the said thermocouple, such device is responsible for the switching of the control circuit onto the outlet of the power source SP of another zone and the introduction into this circuit of a power correction coefficient, so that the control is not interrupted by this failure, but continues, with the holding of the power ratio, which is constantly equal to the value recorded in relationship with the two zones in question. This value has previously been measured and recorded for each zone when the heating of all of zones I to V was operating normally with temperature control.

Thus, as FIG. 5 shows, if the thermocouple of zone II becomes non-operational, the control circuit CR 2 is automatically switched to the outlet of the power source SP 1 of zone I. The missing temperature information is replaced by power information, that is, the value of the power supplied by SP 1. The heat control thus continues in zone II; it is now made a control of power and no longer of temperature.

For greater safety, as is shown in FIG. 4 for the control elements relating to zones I and II, the switching device DC of each zone I to V is connected to the outlets of the power sources SP of a plurality of other zones; in the event of a failure in one zone, the switching takes place according to a predetermined order of priority among the other zones. Thus, the control circuit of zone I may be connected to the power source of zone II or of zone IV (adjacent to zone I), and that of zone II to the power source of zone I or of zone III (adjacent to zone II) or of zone IV (symmetrical to zone II). In general, for a zone which is required to provide a subsidiary reference to a given zone, the zone chosen will respond to external influences in approximately the same way as the assisted zone.

The use of a microprocessor is particularly recommended for the execution of a control device in accordance with the invention. In particular, it makes it possible to effect:

the automatic storage in memory of the power levels consumed zone by zone when the mold is in a state of thermal equilibrium;

the automatic switching of a zone with a defective thermocouple to a mode of operation whereby it is controlled by an adjacent zone, the thermocouple of which zone is operating normally, with the automatic application of the power correction coefficient resulting from the percentage deviation from the equilibrium powers stored in memory.

What is claimed is:

1. A heat control method for hot runner molds having a plurality of heating zones in feed runners of material to be molded, and a temperature control circuit, said method comprising: controlling the electric power applied to a heater element placed in a zone of said plurality of zones as a function of the value of the temperature measured by a thermometric probe placed in the zone, continuously monitoring the functioning of the probe and, upon the probe failing, automatically switching the control circuit to another mode of operation in order to continue supplying electric energy to the corresponding heater element, with a power which is proportional to the supply power of the heater element of another heating zone; said switching step including: applying to the heater element of the zone in which the probe has failed, electric power of a value which has a constant percentage deviation from a reference value constituted by the value of the power applied to the heater element of said another zone, said deviation being maintained equal to that which exists between the values of the powers applied to the heater elements of the two zones in question in equilibrium during normal operation.

2. A method according to claim 1, wherein said other zone is adjacent to or homologous to the zone in which the probe has failed.

3. A method according to claim 1, wherein the percentage deviation between the two power values is maintained equal to that which existed prior to the probe initially failing.

4. A method according to claim 1, wherein the percentage deviation between the two power values is maintained equal to that which was noted and recorded in equilibrium during normal operation.

5. A method according to claim 1, wherein the zone is connected to a plurality of other zones, and wherein upon subsequent probe failures, the control circuit is automatically switched to the supply power of the heater element of another zone according to a predetermined order of priority among the other zones.

* * * * *